US012168383B2

(12) United States Patent
Sivakumar et al.

(10) Patent No.: US 12,168,383 B2
(45) Date of Patent: Dec. 17, 2024

(54) RETAINER FOR PINS TO SUPPORT AXLES UNDER CHASSIS OF WORK MACHINES

(71) Applicant: Caterpillar Inc., Peoria, IL (US)

(72) Inventors: Dinesh Sivakumar, Neyveli (IN); Steven Joseph Fujan, Oro Valley, AZ (US)

(73) Assignee: Caterpillar Inc., Peoria, IL (US)

( * ) Notice: Subject to any disclaimer, the term of this patent is extended or adjusted under 35 U.S.C. 154(b) by 94 days.

(21) Appl. No.: 18/060,141

(22) Filed: Nov. 30, 2022

(65) Prior Publication Data

US 2024/0174039 A1    May 30, 2024

(51) Int. Cl.
| | | |
|---|---|---|
| *B60G 7/02* | (2006.01) | |
| *B60G 7/00* | (2006.01) | |
| *F16B 21/16* | (2006.01) | |

(52) U.S. Cl.
CPC .............. *B60G 7/02* (2013.01); *B60G 7/008* (2013.01); *F16B 21/16* (2013.01); *B60G 2204/143* (2013.01); *B60G 2204/148* (2013.01); *B60G 2300/026* (2013.01)

(58) Field of Classification Search
CPC ......... F16C 11/02; F16C 11/04; F16C 11/045; F16C 17/02; E02F 9/006; B60G 7/02; B60G 7/008; B60G 2204/143; B60G 2204/148; B60G 2300/026; F16B 21/00; F16B 21/02; F16B 21/09; F16B 21/10
See application file for complete search history.

(56) References Cited

U.S. PATENT DOCUMENTS

| | | | |
|---|---|---|---|
| 2,793,543 | A | 5/1957 | Mater |
| 4,096,957 | A | 6/1978 | Iverson et al. |
| 5,290,119 | A | 3/1994 | Kallenberger et al. |
| 5,377,408 | A | 1/1995 | Kallenberger et al. |
| 5,630,673 | A | 5/1997 | Krzywanos et al. |

(Continued)

FOREIGN PATENT DOCUMENTS

| | | |
|---|---|---|
| CA | 2234893 A1 | 10/1999 |
| CN | 202971537 U | 6/2013 |

(Continued)

OTHER PUBLICATIONS

Written Opinion and International Search Report for Int'l. Patent Appln. No. PCT/US2023/076335, mailed Feb. 6, 2024 (8 pgs).

*Primary Examiner* — Jason D Shanske
*Assistant Examiner* — Matthew James O'Neill

(57) ABSTRACT

A retainer for retaining a pin with a section of a work machine. The retainer includes a body to be reversed between a first state and a second state to secure the pin with the section in each of the first state and the second state. The body defines a retaining portion and a securing portion. The securing portion is fixedly coupled to the retaining portion and defines through-holes. In the first state, the through-holes are aligned with apertures of the section for coupling the body to the section such that the retaining portion acquires first orientations relative to the section to engage the pin according to the first orientations. In the second state, the through-holes are aligned with the apertures for coupling the body to the section such that the retaining portion acquires second orientations relative to the section to engage the pin according to the second orientations.

19 Claims, 8 Drawing Sheets

(56) References Cited

U.S. PATENT DOCUMENTS

| | | |
|---|---|---|
| 7,309,186 B2 | 12/2007 | Oertley |
| 8,192,104 B2 | 6/2012 | Mann et al. |
| 9,375,792 B2 | 6/2016 | Sano et al. |
| 9,416,518 B2 | 8/2016 | Ditzler et al. |
| 2003/0131682 A1* | 7/2003 | Crane ................... E02F 3/3613 403/167 |
| 2010/0215426 A1 | 8/2010 | Mann et al. |
| 2016/0319878 A1 | 11/2016 | Gilmore |

FOREIGN PATENT DOCUMENTS

| | | |
|---|---|---|
| CN | 204749763 U | 11/2015 |
| JP | 3770806 B2 | 4/2006 |
| JP | 2012126340 A | 7/2012 |

\* cited by examiner

RETAINER FOR PINS TO SUPPORT AXLES UNDER CHASSIS OF WORK MACHINES

TECHNICAL FIELD

The present disclosure relates to axle assemblies of work machines, e.g., mining trucks and off-highway trucks. More particularly, the present disclosure relates to retainers to retain pins used to couple dog bone linkages in axle assemblies of work machines.

BACKGROUND

Work machines, such as mining trucks, off-highway trucks, etc., are generally employed to transport materials such as ores, boulders, sand, dirt, gravel, etc., from one location to another location at a mine site. Such a work machine typically includes one or more axles to movably support one or more traction devices under a chassis of the mining machine. For example, a front axle may support a set of forward traction devices under the chassis of the mining machine and a rear axle may support a set of rearward traction devices under the chassis of the mining machine. Such axles, e.g., the front axle, are generally coupled to the chassis via one or more links, such as dog bones, suspension struts, etc. By way of such coupling, axles are able to interplay and move with respect to the chassis during machine motion.

While assembling a link (such as the dog bone) with the axle or the chassis, the link may be inserted into a yoke of the axle or the chassis and a pin may be passed through each of the yoke and the link so as to secure the link with the yoke. Such a pin may include an eccentric portion so as to receive the link and accommodate manufacturing tolerances in one or more of the link, the yoke, and/or one or more other parts of the work machine. Therefore, during assembly, as the pin may be manipulated or varied (e.g., rotated) between multiple positions, and once an apt position of the pin is achieved (in which the manufacturing tolerances are accommodated), the pin is required to be positively retained in situ such that its rotary and/or axial movements can be arrested.

U.S. Pat. No. 9,416,518 relates to a ball-and-socket joint for a work vehicle. The ball-and-socket joint comprises a ball stud comprising a ball at an end, and a socket in which the ball is positioned for relative movement between the ball and the socket. The joint may be used to interconnect first and second components, such as for interconnecting a blade and a blade lift mechanism. A retainer ring is configured to distribute a load applied to the first component.

SUMMARY OF THE INVENTION

In one aspect, the disclosure relates to a retainer for retaining a pin with a section of a work machine. The pin rotatably couples a dog bone linkage to the section of the work machine. The retainer includes a body which is configured to be reversed between a first state and a second state to secure the pin with the section in each of the first state and the second state. The body defines a retaining portion and a securing portion. The securing portion is fixedly coupled to the retaining portion and defines a number of through-holes. In the first state, the through-holes are correspondingly aligned with apertures of the section to receive fasteners therethrough for coupling the body to the section such that the retaining portion acquires one or more first orientations relative to the section to engage the pin according to the first orientations. In the second state, the through-holes are correspondingly aligned with the apertures to receive the fasteners therethrough for coupling the body to the section such that the retaining portion acquires one or more second orientations relative to the section to engage the pin according to the second orientations. The second orientations are different from the first orientations.

In another aspect, the disclosure is directed to a work machine. The work machine includes a dog bone linkage, a section defining multiple apertures, a pin rotatably coupling the dog bone linkage to the section, and a retainer. The retainer retains the pin with the section and includes a body configured to be reversed between a first state and a second state to secure the pin with the section in each of the first state and the second state. The body defines a retaining portion and a securing section. The securing portion is fixedly coupled to the retaining portion and defines a number of through-holes. In the first state, the through-holes are correspondingly aligned with the apertures to receive fasteners therethrough for coupling the body to the section such that the retaining portion acquires one or more first orientations relative to the section to engage the pin according to the first orientations. In the second state, the through-holes are correspondingly aligned with the apertures to receive the fasteners therethrough for coupling the body to the section such that the retaining portion acquires one or more second orientations relative to the section to engage the pin according to the second orientations. The second orientations are different from the first orientations.

DETAILED DESCRIPTION

Reference will now be made in detail to specific embodiments or features, examples of which are illustrated in the accompanying drawings. Generally, corresponding reference numbers may be used throughout the drawings to refer to the same or corresponding parts, e.g., 1, 1', 1", 101 and 201 could refer to one or more comparable components used in the same and/or different depicted embodiments.

Figure 1:
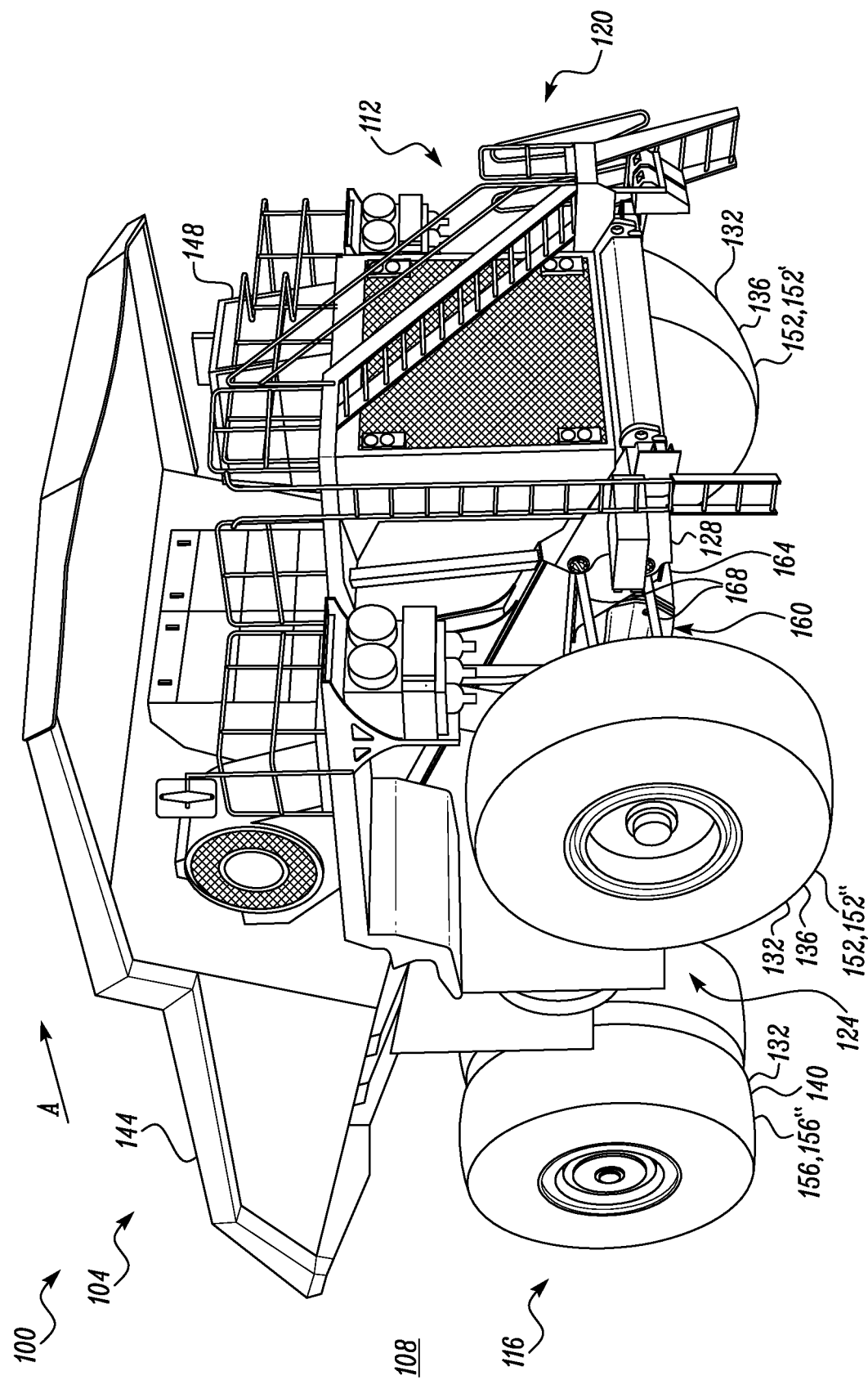
FIG. 1 is a front perspective view of an exemplary work machine, in accordance with one or more aspects of the present disclosure.

Referring to FIG. 1, a work machine 100 is exemplary shown. The work machine 100 may be a mining machine, and may exemplarily embody a dump truck 104, operable at a worksite 108. The worksite 108 may include various locations, such as load locations and dump locations (not shown). Load locations may be locations of the worksite 108 from where the work machine 100 may receive a payload (e.g., ores, boulders, sand, dirt, gravel, etc.), and dump locations may be locations of the worksite 108 to where the work machine 100 may traverse so as to release the payload. Effectively, the work machine 100 may repeatedly traverse back and forth between such locations at the worksite 108 as part of a work cycle. According to an exemplary work cycle, the work machine 100 may receive the payload from a load location, traverse in a forward direction (see direction, A) from the load location to a dump location, release and/or dump the payload at the dump location and traverse back to the load location to receive additional payload, and, in that manner, the work cycle can be repeated for a desired number of instances.

Although references to the dump truck 104 are used, aspects of the present disclosure may also be applicable to other work machines, such as underground mining machines, articulated dump trucks, haul trucks, loaders, wheeled machines, etc., and references to the dump truck 104 in the present disclosure is to be viewed as being purely exemplary. Further, examples of the worksite 108 may include, but no limited to, a mine site, an underground mine site, a construction site, a landfill, a quarry, and the like.

The work machine 100 may define a front end 112 and a rear end 116. The rear end 116 may be disposed opposite to the front end 112. The front end 112 may lead the rear end 116 when the work machine 100 is travelling in the forward direction (i.e., direction, A). A left hand side 120 of the work machine 100 and a right hand side 124 of the work machine 100 may be defined as well. Each of the left hand side 120 and the right hand side 124 may be defined on the lateral opposing sides of the work machine 100 and said left hand side 120 and right hand side 124 can be relatable and understood when viewing the work machine 100 from the rear end 116 of the work machine 100 towards the front end 112 of the work machine 100.

The work machine 100 may include a main frame or a chassis 128 and multiple traction devices (see traction devices 132). The traction devices 132 may include front traction devices 136 located towards the front end 112 of the work machine 100 and rear traction devices 140 located towards the rear end 116 of the work machine 100. The work machine 100 may further include a propulsion system, such as an internal combustion engine, (not shown) to provide motive power to the traction devices 132 such that the traction devices 132 (and thus the work machine 100) can move with respect to a ground surface of the worksite 108. Further, the work machine 100 may include a tiltable dump body 144 to receive and release payload. Also, the work machine 100 may include an operator cabin 148 to station one or more operators on the work machine 100 so that various functional/operational aspects of the work machine 100 can be controlled. In some cases, the operator cabin 148 may be a remote operator cabin and which may be located away or remotely to the rest of the work machine 100 such that the work machine 100 can be controlled remotely from said remote operator cabin.

The traction devices 132 of the work machine 100 (i.e., each of the front traction devices 136 and the rear traction devices 140) may support the chassis 128 on the ground surface of the worksite 108. The front traction devices 136 may include a set of front wheels 152 and the rear traction devices 140 may include a set of rear wheels 156. As shown, the set of front wheels 152 may support a front portion of the chassis 128 on the ground surface, while the set of rear wheels 156 may support a rear portion of the chassis 128 on the ground surface.

Further, the set of front wheels 152 may be disposed along a width of the work machine 100 such that at least one front wheel (e.g., see left front wheel 152) of the set of front wheels 152 can occupy a position at or towards the left hand side 120 of the work machine 100 and at least one another front wheel (e.g., see right front wheel 152) of the set of front wheels 152 can occupy a position at or towards the right hand side 124 of the work machine 100. Similarly, the set of rear wheels 156 may also be disposed along a width of the work machine 100 such that at least one rear wheel (not shown) of the set of rear wheels 156 can occupy a position at or towards the left hand side 120 of the work machine 100 and at least one another rear wheel (e.g., see right rear wheel 156") of the set of rear wheels 156 can occupy a position at or towards the right hand side 124 of the work machine 100. In some embodiments, the traction devices 132 can include crawler tracks either alone or in combination with one or more of the set of front wheels 152 and/or the set of rear wheels 156.

Further, the work machine 100 may include one or more axle assemblies. The axle assemblies may be configured to support the traction devices 132 with the chassis 128 of the work machine 100. The axle assemblies may include or correspond to a front axle assembly 160 and a rear axle assembly (not shown). As illustrated, the front axle assembly 160 may support the set of front wheels 152 with the front portion of the chassis 128 and the rear axle assembly (not shown) may support the set of rear wheels 156 with the rear portion of the chassis 128. Further discussion below is mainly focused on the front axle assembly 160, but similar discussions may be also applicable for the rear axle assembly and which may be contemplatable by someone skilled in the art based on the present disclosure. The front axle assembly 160 includes an axle 164 and multiple links (see links 168) that movably couple the axle 164 to the chassis 128.

Figure 2:
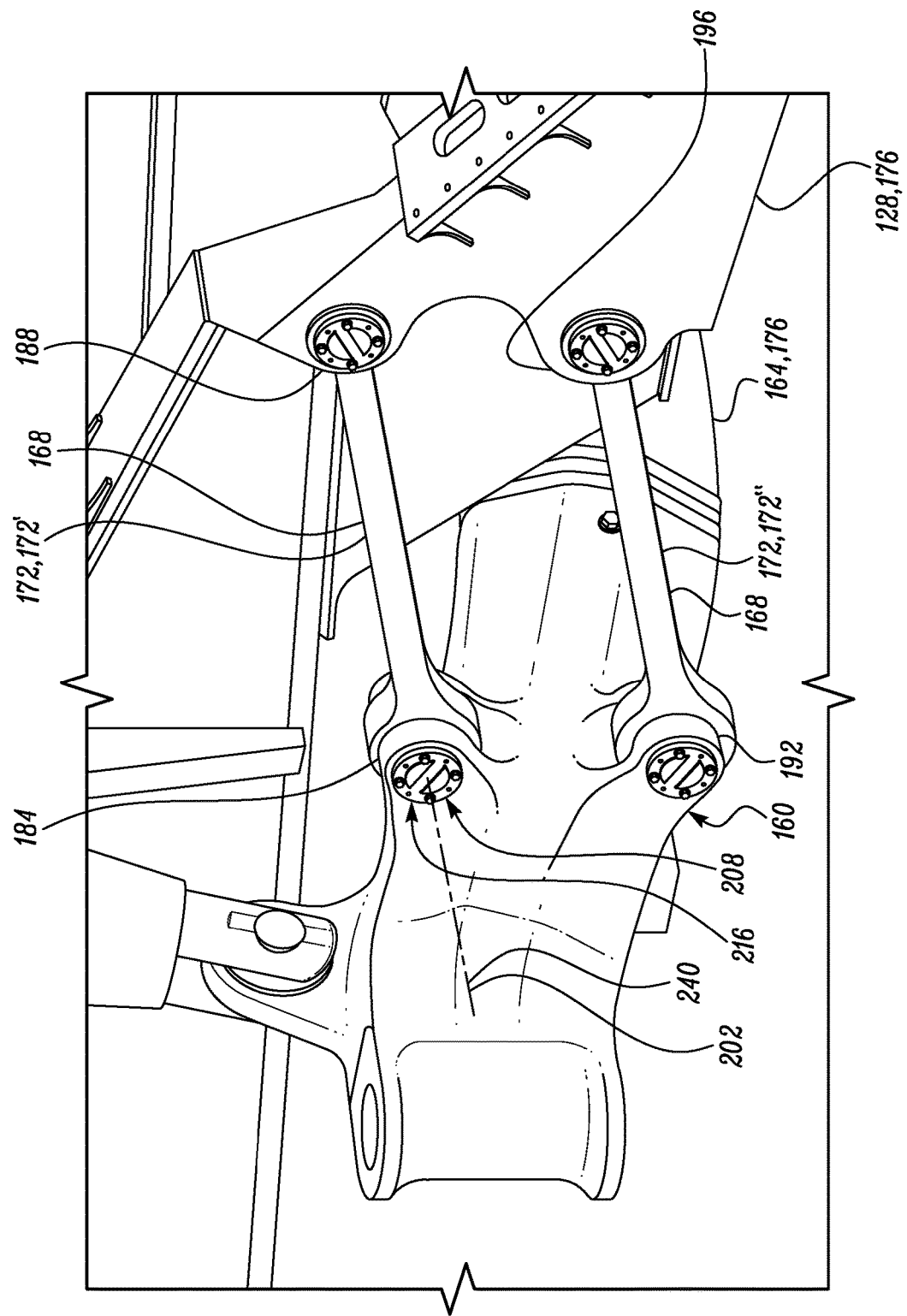
FIG. 2 is an internal layout of the work machine illustrating portions of a chassis and an axle assembly of the work machine, in accordance with one or more aspects of the present disclosure.
Figure 3:
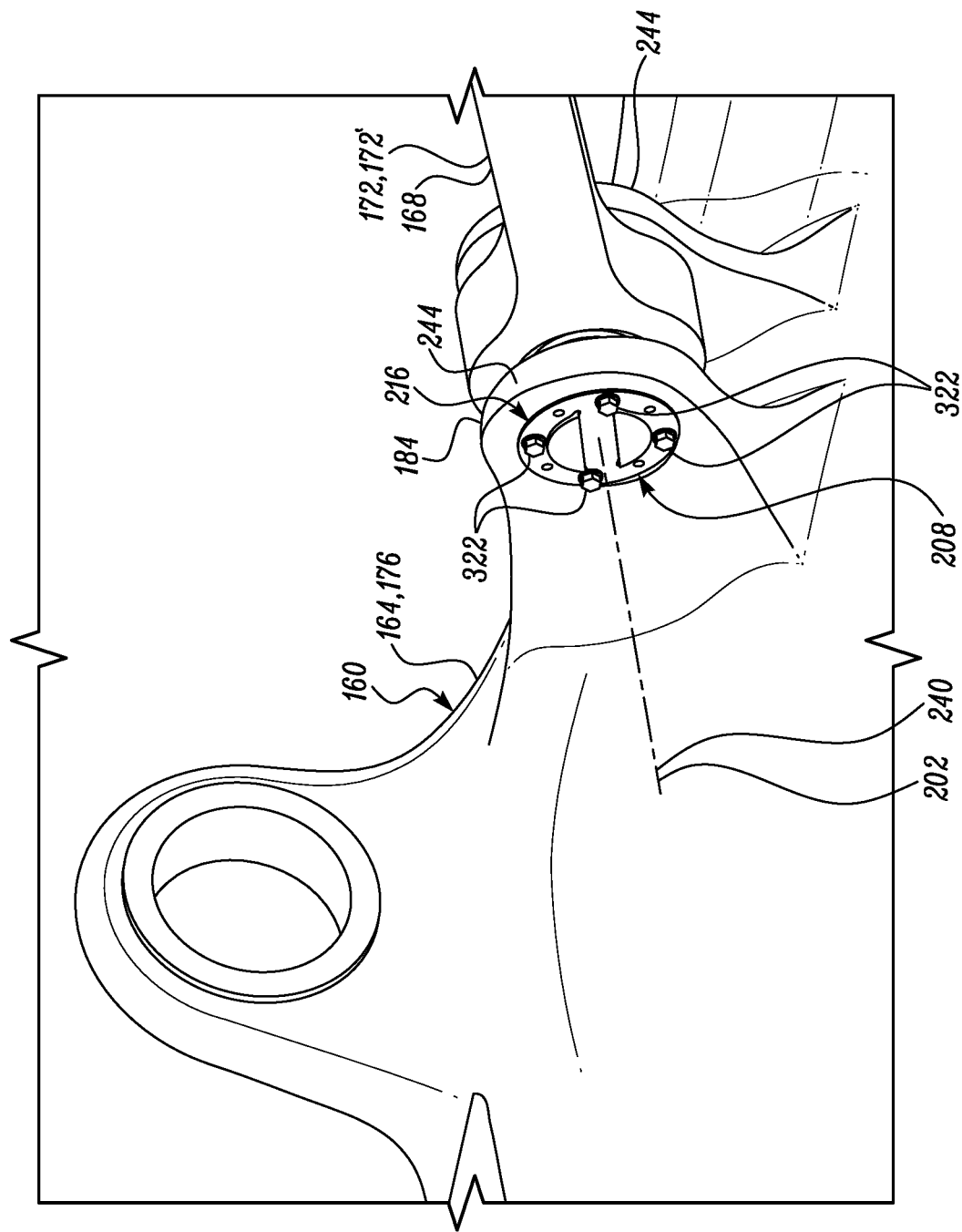
FIG. 3 is an enlarged view illustrating a connection arrangement between the axle and a dog bone linkage extending from the chassis, in accordance with one or more aspects of the present disclosure.

Referring to FIGS. 2 and 3, the links 168 may be configured to movably couple the axle 164 with the front portion of the chassis 128. Said links 168 may include dog bone linkages 172 (e.g., see a first dog bone linkage 172' and a second dog bone linkage 172" in FIG. 2). It may be noted that only the dog bone linkages 172 of the front axle assembly 160 that are disposed towards the right hand side 124 of the work machine 100 are shown. Similar dog bone linkages of the front axle assembly 160 may be present towards the left hand side 120 of the work machine 100 as well, and description for the dog bone linkages 172 in the present disclosure may be suitably applicable for the dog bone linkages disposed towards the left hand side 120, as well. The front axle assembly 160 may also include a variety of other links, such as pan hard links and suspension struts, but which are well known and understood by someone of ordinary skill, and thus are not discussed.

For the purposes of the present disclosure, the axle 164 and the chassis 128 may be each referred to as a section 176 of the work machine 100. The dog bone linkages 172 may be movably (e.g., rotatably) coupled between such sections 176. Said movable (or rotatable) coupling of the dog bone linkages 172 between the sections 176 allows the sections (i.e., the axle 164 and the chassis 128) to move and articulate with respect to each other such that the axle 164 can interplay and move with respect to the chassis 128 of the work machine 100 during machine motion.

In further detail, each section 176 (i.e., each of the axle 164 and the chassis 128) may include yoke portions. For example, the axle 164 includes two primary yoke portions and the chassis 128 includes two secondary yoke portions. As shown, the first dog bone linkage 172' may be movably (e.g., rotatably) and correspondingly coupled between a first primary yoke portion 184 of the axle 164 and a first secondary yoke portion 188 of the chassis 128 while the second dog bone linkage 172" may be movably (e.g., rotatably) and correspondingly coupled between a second primary yoke portion 192 of the axle 164 and a second secondary yoke portion 196 of the chassis 128. With said configuration, the first dog bone linkage 172' and the second dog bone linkage 172", along with a similar configuration present on the left hand side 120 of the work machine 100, can restrain movements of the axle 164 in the forward direction (i.e., a direction defined parallel to the direction of travel of the work machine) (e.g., direction, A) with respect to the chassis 128 of the work machine 100.

According to an aspect of the present disclosure, the first dog bone linkage 172' may rotate with respect to the first primary yoke portion 184 of the axle 164 about a link axis 200. Further, the section 176 or the first primary yoke portion 184 of the axle 164 may include an opening 348 defining an opening axis 202. The section 176 or the first primary yoke portion 184 of the axle 164 also includes a number of apertures 204 (see FIGS. 4 and 5) structured and arranged around the opening axis 202. A layout of the apertures 204 may be circular and the apertures 204 may be rotationally and equidistantly arrayed about the opening axis 202. Also, it may be noted that when the first dog bone linkage 172' is assembled with the first primary yoke portion 184 of the axle 164, the link axis and the opening axis 202 may not fall in line with each other, and rather they may be at an offset with each other—details related to such an arrangement will be understood from the forthcoming description.

Further discussion below is mainly focused on the first dog bone linkage 172' and its movable connection thereof with the first primary yoke portion 184. Equivalent description may be applicable to a connection between the first dog bone linkage 172' and the first secondary yoke portion 188 as well. Moreover, such description can also be applicable to the connection of the second dog bone linkage 172" with each of the second primary yoke portion 192 and the second secondary yoke portion 196. Further, similar description can also be applied to the dog bone linkages and yoke portions arranged on the left hand side 120 of the work machine 100. In some embodiments, such description may be suitably applicable for arrangements that include one or more linkages at or around the rear axle assembly, as well.

Figure 4:
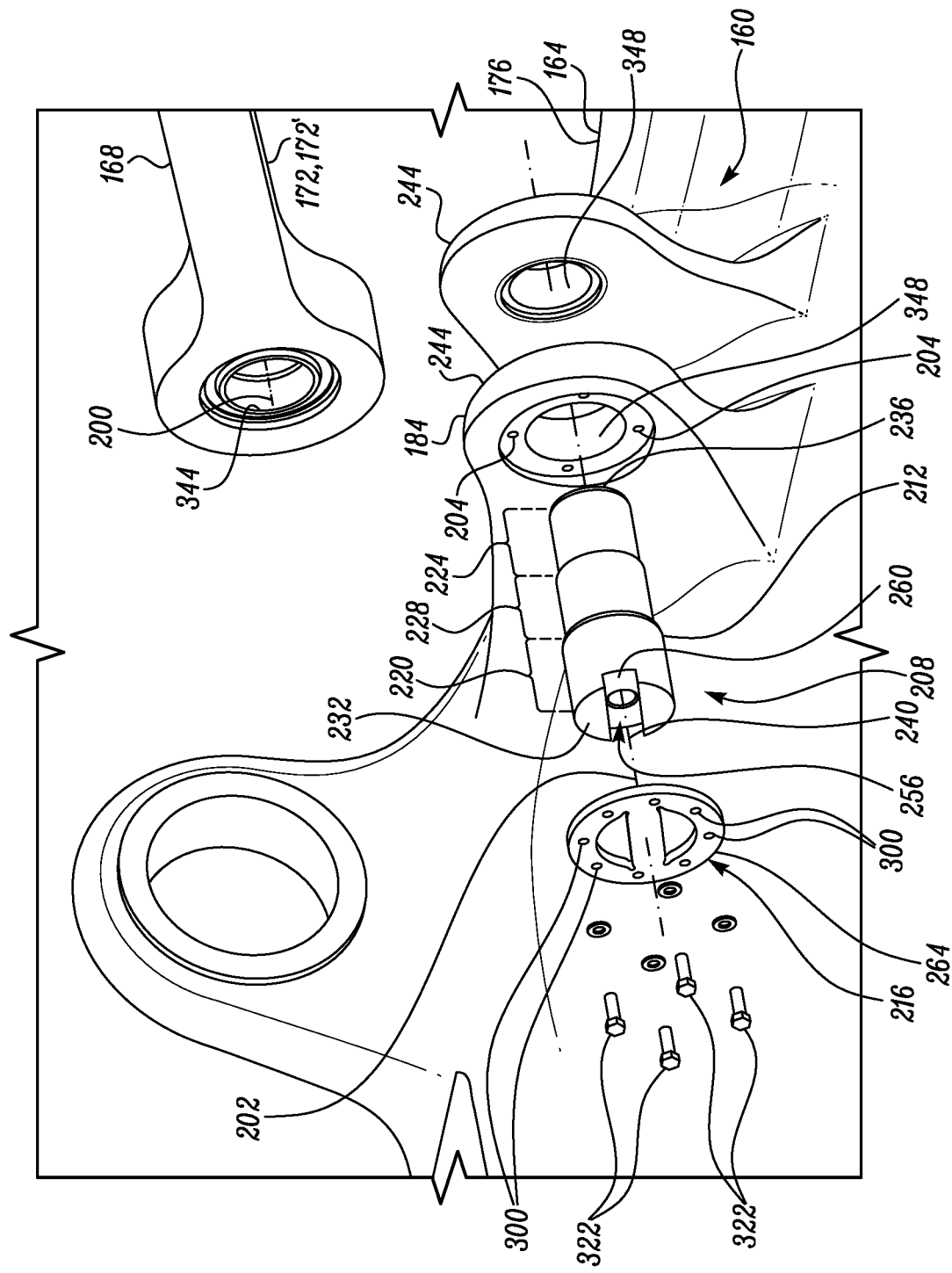
FIG. 4 is an exploded view of the connection arrangement, in accordance with one or more aspects of the present disclosure.
Figure 5:
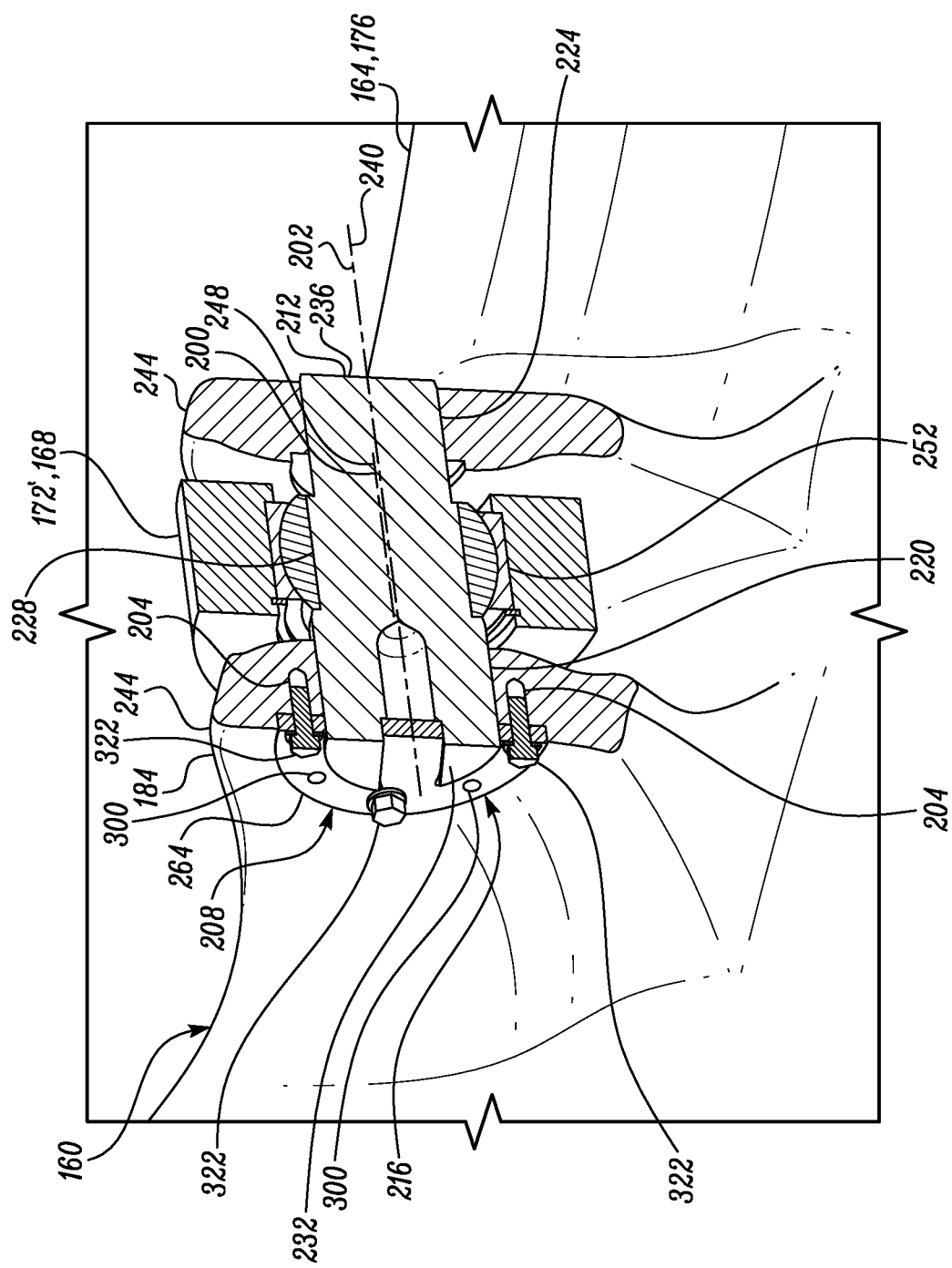
FIG. 5 is a cross-sectional view of the connection arrangement, in accordance with one or more aspects of the present disclosure.
Figure 6:
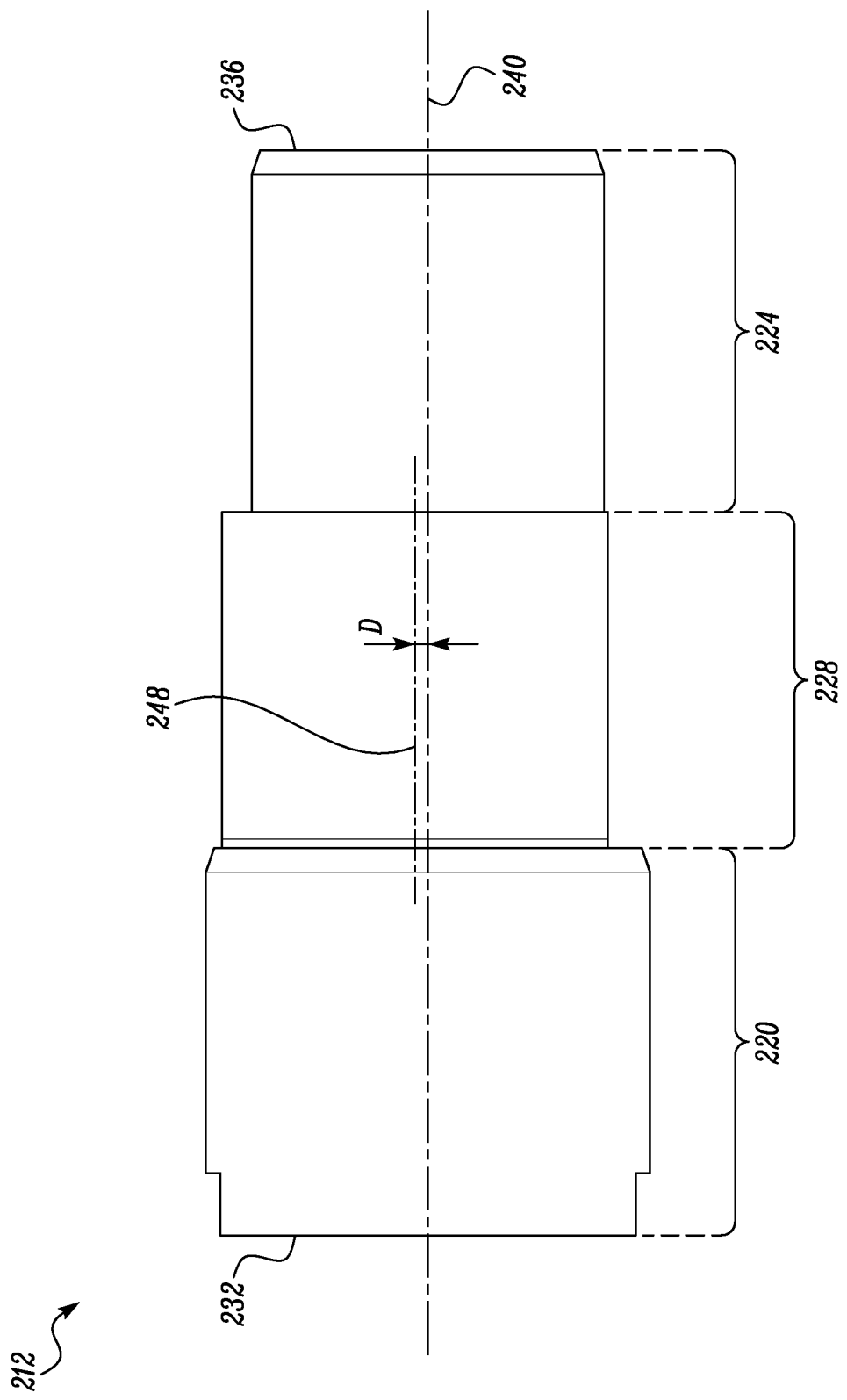
FIG. 6 is a view of a pin of the connection arrangement, in accordance with one or more aspects of the present disclosure.

Referring to FIGS. 4, 5, and 6, the first dog bone linkage 172' and its movable connection with the first primary yoke portion 184 may be attained by way of a connection arrangement 208 of the front axle assembly 160. The connection arrangement 208 may include a pin 212 and a retainer 216. The connection arrangement 208 may also include various other parts or components, but aspects of the present disclosure are focused mainly on the pin 212 and the retainer 216.

The pin 212 includes a generally elongated and cylindrical structure with a first cylindrical lobe portion 220, a second cylindrical lobe portion 224, and an intermediate cylindrical lobe portion 228. The first cylindrical lobe portion 220 defines a first axial end 232 of the pin 212 while the second cylindrical lobe portion 224 defines a second axial end 236 of the pin. The first cylindrical lobe portion 220 may be co-axially arranged relative to the second cylindrical lobe portion 224. Also, the first cylindrical lobe portion 220 may be oppositely disposed (e.g., axially oppositely) relative to the second cylindrical lobe portion 224, as shown. Both the first cylindrical lobe portion 220 and the second cylindrical lobe portion 224 may define a pin axis 240 (e.g., which may be common to each of the first cylindrical lobe portion 220 and the second cylindrical lobe portion 224). The first cylindrical lobe portion 220 and the second cylindrical lobe portion 224 may be correspondingly received into the spaced-apart yoke arms 244 of the first primary yoke portion 184 of the section 176 (i.e., the axle 164), as illustrated.

The intermediate cylindrical lobe portion 228 may be structured and arranged between the first cylindrical lobe portion 220 and the second cylindrical lobe portion 224, as shown. Also, the intermediate cylindrical lobe portion 228 may be disposed eccentrically relative to each of the first cylindrical lobe portion 220 and the second cylindrical lobe portion 224. In that manner, an intermediate axis 248 (see FIG. 6) defined by the intermediate cylindrical lobe portion 228 is disposed at a distance or at an offset, D, to the pin axis 240. Further, the intermediate cylindrical lobe portion 228 may receive (e.g., rotatably) the first dog bone linkage 172' therearound. As shown in the cross-sectional view of the connection arrangement 208 in FIG. 5, an interface between the first dog bone linkage 172' and the intermediate cylindrical lobe portion 228 may include a bearing unit 252, and, by way of the bearing unit 252, the pin 212 may rotatably couple the first dog bone linkage 172' to the section 176 (i.e., the axle 164) of the work machine 100 allowing the first dog bone linkage 172' to freely move or rotate relative to the section 176 (i.e., the axle 164) and about the link axis 200 or the intermediate axis 248 (see FIG. 6) defined by the intermediate cylindrical lobe portion 228 of the pin 212.

Additionally, it may be noted that the cross-sectional areas of the first cylindrical lobe portion 220, the second cylindrical lobe portion 224, and the intermediate cylindrical lobe portion 228 may be different from each other. Exemplarily, the first cylindrical lobe portion 220 may define the largest cross-sectional area of the pin 212, the second cylindrical lobe portion 224 may define the smallest cross-sectional area of the pin 212, and the intermediate cylindrical lobe portion 228 may define a cross-sectional area which is intermediate to the cross-sectional areas defined by the first cylindrical lobe portion 220 and the second cylindrical lobe portion 224 of the pin 212. Additionally, the pin 212 may define an engaging portion 256 (see FIG. 4) to engage with the retainer 216. In some embodiments, the engaging portion 256 includes a keyway 260 structured at the first axial end 232 of the pin 212 and which may be in the form of a groove that is recessed into a body of the pin 212 and which extends diametrically across said first axial end 232 of the pin 212.

The retainer 216 of the connection arrangement 208 may be applied for retaining (e.g., fixedly retaining) the pin 212 with the section 176 (i.e., the axle 164). The retainer 216 may include a body 264 with a securing portion 268 and a retaining portion 272. Details related to each of the securing portion 268 and the retaining portion 272 are provided below.

Figure 7:
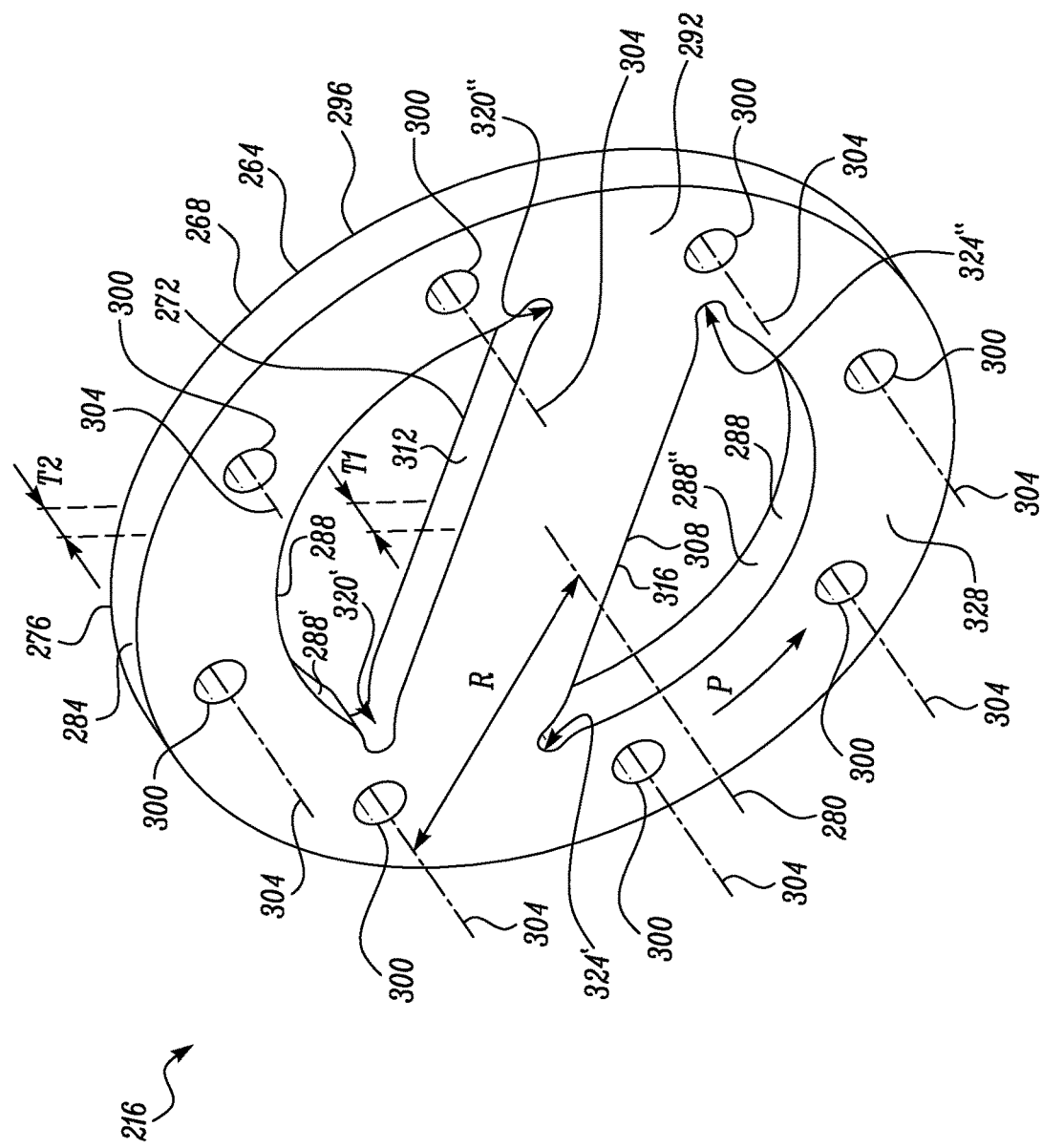
FIGS. 7 and 8 are various views illustrating states of a retainer of the connection arrangement, in accordance with one or more aspects of the present disclosure.
Figure 8:
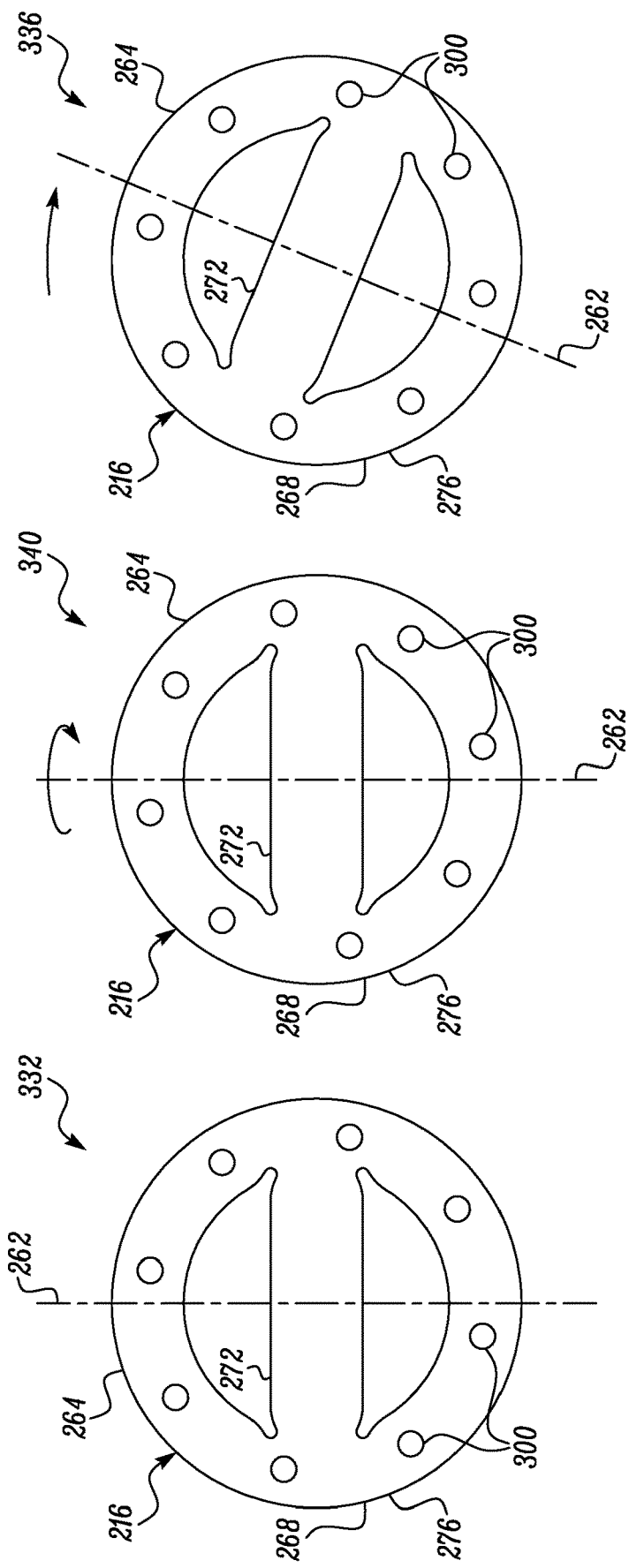

Referring to FIGS. 7 and 8, the securing portion 268 is configured to be coupled to the section 176 (e.g., to the first primary yoke portion 184 of the axle 164) of the work machine 100. The securing portion 268 may include a generally ring-shaped profile and may correspond to an annular structure 276, as shown. The annular structure 276 may define a central annular axis 280 and may further define an outer circumferential surface 284 and an inner circumferential surface 288. Both the outer circumferential surface 284 and the inner circumferential surface 288 may be defined concentrically about the central annular axis 280. The annular structure 276 may also define a first annular axial end surface 292 and a second annular axial end surface 296. The second annular axial end surface 296 may be defined oppositely (e.g., axially oppositely) to the first annular axial end surface 292.

Further, the securing portion 268 may define a number of through-holes 300 on the annular structure 276 (only few through-holes 300 are marked). The through-holes 300 may extend (e.g., along the central annular axis 280) from the first annular axial end surface 292 to the second annular axial end surface 296. The through-holes 300 may be rotationally and equidistantly arrayed on the annular structure 276 about the central annular axis 280 and may be defined along an annular path, P, defined by the annular structure 276. In some embodiments, each of the through-holes 300 may define a hole axis 304 and the central annular axis 280 may be equidistant (e.g., see distance, R) from each hole axis 304, thus imparting a circular profile to the layout of the through-holes 300 on the annular structure 276. Although not limited, a number of the through-holes 300 may be equal to the number of the apertures 204 and said through-holes 300 may be arranged or laid out on the annular structure 276 in the same format or configuration as the apertures 204 are arranged and laid out on the section 176 (or the axle 164). Optionally, the number of apertures 204 may be less than or greater than the number of through-holes 300.

The retaining portion 272 may be fixedly coupled to and/or integrally formed with the securing portion 268 and may be configured to engage the pin 212. As an example, the retaining portion 272 may include an arm 308 extending linearly and diametrically across the annular structure 276, as shown. In so doing, the arm 308 symmetrically divides the inner circumferential surface 288 into a first inner circumferential surface 288' and a second inner circumferential surface 288". With regard to the engagement of the retaining portion 272 with the pin 212, the arm 308 may be received into the keyway 260 defined by the pin 212 to engage the pin 212.

Further, the arm 308 defines a first side edge surface 312 and a second side edge surface 316. The first side edge surface 312 faces the first inner circumferential surface 288' and interfaces with the first inner circumferential surface 288' at diametrical end portions defined by the arm 308, and, similarly, the second side edge surface 316 faces the second inner circumferential surface 288" and interfaces with the second inner circumferential surface 288" at diametrical end portions defined by the arm 308. The body 264 of the retainer 216 may define corresponding first stress relieving regions 320', 320" at corresponding interfaces defined between the first side edge surface 312 and the first inner circumferential surface 288', and, similarly, may define corresponding second stress relieving regions 324', 324" at corresponding interfaces defined between the second side edge surface 316 and the second inner circumferential surface 288".

In some embodiments, the arm 308 may define a thickness, T1, which is equal to a thickness, T2, defined by the annular structure 276 spanning between the first annular axial end surface 292 and the second annular axial end surface 296. In that manner, opposing surfaces of the arm 308 may correspondingly sit flush and be contiguous with the first annular axial end surface 292 and the second annular axial end surface 296 so that all said surfaces may extend along the same plane. The arm 308 and the annular structure 276 of the retainer 216 itself may extend along a common plane 328.

Referring to FIG. 8, it may be noted that the locations assumed or acquired by the through-holes 300 relative to the retaining portion 272 when viewing the body 264 from the first annular axial end surface 292 towards the second annular axial end surface 296 may be different from the locations assumed or acquired by the through-holes 300 relative to the retaining portion 272 when viewing the body 264 from the second annular axial end surface 296 towards the first annular axial end surface 292.

In this regard, the body 264 may be reversed or flipped about a flip axis 262 between a first state 332 and a second state 336, and in each of the first state 332 and the second state 336, the body 264 of the retainer 216 is able to secure the pin 212 with the section 176 (or the axle 164). Notably, when the second annular axial end surface 296 faces the section 176 and the first annular axial end surface 292 faces away from the section 176, e.g., during an assembly of the retainer 216 with the section 176, a state achieved by the body 264 of the retainer 216 may correspond to the first state 332. Conversely, when the first annular axial end surface 292 faces the section 176 and the second annular axial end surface 296 faces away from the section 176, e.g., during an assembly of the retainer 216 with the section 176, a state achieved by the body 264 of the retainer 216 may correspond to the second state 336.

In further detail, in the first state 332, the through-holes 300 may be correspondingly aligned with the apertures 204 of the section 176 to receive fasteners 322 therethrough for coupling the body 264 to the section 176 (or the axle 164) such that the retaining portion 272 acquires one or more first orientations relative to the section to engage the pin 212 according to the one or more first orientations. In the second state, the through-holes 300 may be correspondingly aligned with the apertures 204 of the section 176 (or the axle 164) to receive the fasteners 322 therethrough for coupling the body 264 to the section 176 (or the axle 164) such that the retaining portion 272 acquires one or more second orientations relative to the section 176 (or the axle 164) to engage the pin 212 according to the one or more second orientations. The second orientations may be different from the first orientations.

Details related to each of the first state 332 and the second state 336 and also an intermediate state 340 achieved during the switch or reversal from one of the first state 332 and the second state 336 to the other of the first state 332 and the second state 336 are discussed further below in the present disclosure along with some examples.

INDUSTRIAL APPLICABILITY

During an exemplary assembly of the first dog bone linkage 172' with the first primary yoke portion 184, an operator may insert the first dog bone linkage 172' into a space defined between the spaced-apart yoke arms 244. Then, the operator may align the openings 344, 348 correspondingly provided in the first dog bone linkage 172' and the spaced-apart yoke arms 244 and inserts the pin 212 into said openings 344, 348 with the second axial end 236 of the pin 212 entering into the openings 344, 348 first. When the pin 212 is properly inserted into the openings 344, 348, the link axis 200 and the intermediate axis 248 may be both aligned with each other, and also, the pin axis 240 may be aligned with the opening axis 202.

Because the cross-sectional area of the first cylindrical lobe portion 220 is greater than each of the second cylindrical lobe portion 224 and the intermediate cylindrical lobe portion 228, an excessive ingress of the pin 212 into the openings 344, 348 is arrested. In so doing, and as described above, the first cylindrical lobe portion 220 and the second cylindrical lobe portion 224 of the pin 212 may be correspondingly received into the openings 348 of the spaced-apart yoke arms 244 of the first primary yoke portion 184, while the intermediate cylindrical lobe portion 228 of the pin 212 may be received into the opening 344 of the first dog bone linkage 172'. Also, once the pin 212 is properly inserted into the openings 344, 348, the first axial end 232 may face outwards, thus revealing the keyway 260 to the operator.

It may be noted that as part of the assembly of the pin 212 with the spaced-apart yoke arms 244 and the first dog bone linkage 172'', the operator may also cause the pin 212 to be manipulated or varied (e.g., rotated) about the pin axis 240 or about the opening axis 202. By doing so, the intermediate cylindrical lobe portion 228 can be eccentrically rotated about the pin axis 240 and brought to a position where manufacturing tolerances in one or more of the first dog bone linkage 172', the first primary yoke portion 184, and/or one or more other parts of the work machine 100 can be all aptly accommodated.

At this stage, or just after the pin 212 is inserted into the openings 344, 348, it is however possible for the pin 212 to walk out of the openings 344, 348 in a direction that is in reverse to the ingress direction (i.e., reverse to the direction in which the pin 212 was inserted into the openings 344, 348). To prevent said walk out of the pin 212, the operator may bring forth the retainer 216 to immovably couple the pin 212 with the section 176 (or the axle 164). As part of a coupling process between the retainer 216 and the section 176 (or the axle 164), the operator may insert the retaining portion 272 (e.g., the arm 308) of the retainer 216 into the keyway 260 and aligns the through-holes 300 with the apertures 204.

Effectively, once the pin 212 is properly inserted and the tolerances are properly accommodated, the operator makes the attempt to attain the best possible alignment between the through-holes 300 and the apertures 204 such that the manufacturing tolerances can remain best accommodated even when the retainer 216 is coupled (e.g., immovably coupled) to the section 176 and a movement (axial or rotary) of the pin 212 is locked owing to an engagement of the pin 212 with the retaining portion 272. As soon as the best possible alignment is attained and the through-holes 300 are aligned with the apertures 204, the operator may drive the fasteners 322 through the through-holes 300 and the apertures 204 so as to immovably couple the retainer 216 with the section 176 (or the axle 164) and to immovably retain the pin 212 with the section 176 (or the axle 164).

The flexibility offered by the multiple number of through-holes 300, which may be more than two—for example, eight (i.e., 8) in the present disclosure) and the multiple number of apertures 204, which may be more than two—for example, four (i.e., 4) in the present disclosure, assists the operator to attain the best possible alignment between the through-holes 300 and the apertures 204. Said flexibility is enhanced and generally doubled when the body 264 of the retainer 216 is reversed or flipped by 180 degrees about the flip axis 262 (see FIG. 8), because, when the body 264 is flipped, the through-holes 300 can still be brought to be in alignment with the apertures 204 but offers a variation in the orientation of the retaining portion 272 or the arm 308 when compared to the orientation of the retaining portion 272 or the arm 308 when the body 264 was not flipped.

In further detail, considering during an assembly of the retainer 216 with the pin 212, the second annular axial end surface 296 were to face the section 176 (or axle 164) and the first annular axial end surface 292 were to face away from the section 176 (or axle 164), an operator is at liberty to toggle (e.g., rotationally toggle about the central annular axis 280) between multiple positions of the retainer 216 against the section 176 (or axle) such that the best possible alignment between the through-holes 300 and the apertures 204 is achieved in the first state 332 of the body 264. Said multiple positions can be equal to the number of through-holes 300 arranged on the securing portion 268 or annular structure 276 of the retainer 216. For example, if eight (i.e., 8) through-holes 300 were arranged on the securing portion 268 (as also exemplarily illustrated in the figures), eight (i.e., 8) different positions of the retainer 216 can be achieved against the section 176 (or axle 164) (along with eight (i.e., 8) corresponding positions of the pin 212).

However, if the operator is unable to attain the best possible alignment between the through-holes 300 and the apertures 204 in the aforementioned configuration of the body 264, the operator can reverse or flip the body 264 of the retainer 216 (e.g., by 180 degrees about the flip axis 262) such that the first annular axial end surface 292 faces the section 176 (or axle 164) and the second annular axial end surface 296 faces away from the section 176 (or the axle 164). Because the locations assumed or acquired by the through-holes 300 relative to the retaining portion 272 when viewing the body 264 from the first annular axial end surface 292 towards the second annular axial end surface 296 may be different from the locations assumed or acquired by the through-holes 300 relative to the retaining portion 272 when viewing the body 264 from the second annular axial end surface 296 towards the first annular axial end surface 292, the operator can additionally toggle (e.g., rotationally about the central annular axis 280) between an equivalent but a different number of positions of the retainer 216 against the section 176 (or axle 164) such that the best possible alignment between the through-holes 300 and the apertures 204 can be achieved in the second state 336 of the body 264.

As an example, if eight (i.e., 8) through-holes 300 are provided, the operator can attain eight (i.e., 8) different positions of the retainer 216 against the section 176 or the axle 164 (and thus corresponding positions of the pin 212 to accommodate the manufacturing tolerances), with the second annular axial end surface 296 facing the section 176 and the first annular axial end surface 292 facing away from the section 176 (first state 332), and then, further attain an additional eight (i.e., 8) different positions of the retainer 216 against the section 176 or the axle 164 (and thus corresponding further positions of the pin 212 to accommodate the manufacturing tolerances), with the first annular axial end surface 292 facing the section 176 and the second annular axial end surface 296 facing away from the section 176 (second state 336). With an exemplary eight (i.e., 8) through-hole retainer, e.g., retainer 216, (as exemplarily provided in the present disclosure), therefore, the operator can toggle between and peruse sixteen (i.e., 16) different positions of the pin 212 (obtained by summating eight (i.e., 8) with eight (i.e., 8)) for accommodating the manufacturing tolerances.

Continuing with the same example of eight (i.e., 8) through-holes in the retainer 216, if a similar retainer is provided for attaining a connection between the first dog bone linkage 172' and the first secondary yoke portion 188, the operator is at liberty to choose between two hundred and fifty six (i.e., 256) different positional options to arrive at the best alignment of the first dog bone linkage 172' such that the first dog bone linkage 172' can be aptly accommodated between the two sections 176 (i.e., the axle 164 and the chassis 128). The number '256' is arrived at by achieving a product of sixteen (i.e., 16) positions attainable by the retainer 216 with the other sixteen (i.e., 16) positions attainable by a similar retainer used for the connection between the first dog bone linkage 172' and the first secondary yoke portion 188 of the chassis 128. Moreover, it may be noted that if similar eight through-hole retainers were provided at either ends of the first dog bone linkage 172', a possibility to accommodate the first dog bone linkage 172' having eighty one (81) different lengths between the axle 164 and the chassis 128 exists. The configuration of the retainer 216, therefore, eases the assembly between the axle 164 and the chassis 128, while also saving time and effort, and negates the need to using methods such as welding to attain a coupling between the retainer 216 and the section 176. Of course, the numbers or examples above are provided for illustrative purposes and they can vary in actual applications.

Effectively, the retainer 216 is configured to be switched or reversed between the first state 332 and the second state 336. More particularly, it may be noted that in the first state 332 of the body 264 of the retainer 216, the through-holes 300 may be correspondingly aligned with the apertures 204 so as to receive fasteners 322 therethrough for coupling the annular structure 276 (and accordingly the retaining portion 272 and the body 264 of the retainer 216) to the section 176 such that the retaining portion 272 acquires one or more first orientations relative to the section 176 (see orientation of the retaining portion 272 with respect to the through-holes 300 of the securing portion 268 in the first state 332, FIG. 8) to engage the pin 212 according to the one or more first orientations. Conversely, it may be noted that in the second state 336 of the body 264 of the retainer 216, the through-holes 300 may be correspondingly aligned with the apertures 204 so as to receive the fasteners 322 therethrough for coupling the annular structure 276 (and accordingly the retaining portion 272 and the body 264 of the retainer 216) to said same section 176 such that the retaining portion 272 acquires one or more second orientations relative to the section 176 (see orientation of the retaining portion 272 with respect to the through-holes 300 of the securing portion 268 in the second state 336, FIG. 8) to engage the pin 212 according to the one or more second orientations. It may be noted that the second orientations may be different from the first orientations.

In each of the first state 332 and the second state 336, the retainer 216 is applied to secure and retain the pin 212 with the section 176 or the axle 164 such that the pin 212 becomes immovable (both axially and rotationally) with respect to the section 176 or the axle 164. Although not limited, the body 264 may be flipped 180 degrees about the flip axis 262 from one of the first state 332 and the second state 336 to switch to and arrive at the other of the first state 332 and the second state 336. Further, the flip axis 262 about which the body 264 may be switched or reversed so as to move between the first state 332 and the second state 336 may be defined and/or may extend in the common plane 328. Also, the flip axis 262 may be perpendicular to the central annular axis 280.

When the number of apertures 204 are unequal to the number of through-holes 300, it is possible that only some of the through-holes 300 are aligned with the apertures 204 or that only some of the apertures 204 are aligned with the through-holes 300. Irrespective of the first state 332 or the second state 336, the body 264 may be suitably manipulated (e.g., rotationally about the central annular axis 280) in each of the first state 332 and the second state 336 such that at least some of the through-holes 300 are complimented and aligned with at least some of the apertures 204.

With continued reference to FIG. 8, it will be appreciated that the process to switch or reverse the body 264 from one of the first state 332 and the second state 336 to the other of the first state 332 and the second state 336 also requires that the body 264 attain an intermediate state 340. In other words, when switching or reversing the body from one of the first state 332 and the second state 336 to the other of the first state 332 and the second state 336, the intermediate state 340 may be arrived at and may correspond to a state of the body 264 attained prior to attaining the other of the first state 332 and the second state 336.

As an example process involving the switching or reversing of the body 264 from the first state 332 to the second state 336, when, at start, the body 264 is in the first state 332, the body 264 may define a first layout of the through-holes 300 with respect to the retaining portion 272 when viewing the body 264 from the first annular axial end surface 292 towards the second annular axial end surface 296. Also, in the first state 332, the retaining portion 272 is able to acquire one or more first orientations (or multiple first orientations) relative to the section 176 to engage the pin 212 according to said first orientations as the retainer 216 is able to toggle between multiple positions about the central annular axis 280.

As an operator flips the body 180 degrees about the flip axis 262, the intermediate state 340 is achieved. In the intermediate state 340, the operator may generally view the body 264 from the second annular axial end surface 296 towards the first annular axial end surface 292. Therefore, in the intermediate state 340, the body 264 may define a second layout of the through-holes 300 with respect to the retaining portion 272. The second layout may be different from the first layout. In other words, in the intermediate state 340, the through-holes 300, attain a layout with respect to the retaining portion 272 which is different from the layout of the through-holes 300 with respect to the retaining portion 272 attained in the first state 332.

In the intermediate state, the through-holes 300 may however not be aligned with the apertures 204 and thus the body 264 should be rotated or turned from the intermediate state 340 to the second state 336 such that the through-holes 300 may be brought to alignment with the apertures 204. To attain the second state 336 from the intermediate state 340 and enable the through-holes 300 to achieve alignment with the apertures 204, the operator may turn or rotate the body 264 about the central annular axis 280 such that the through-holes 300 can be brought up to alignment with the apertures 204. In that manner, the second state 336 is achieved retaining and/or continuing with the same layout (i.e., second layout) of the through-holes 300 which was achieved at the intermediate state 340. Also, in the second state 336, the retaining portion 272 is able to acquire one or more second orientations (or multiple second orientations) relative to the section 176 to engage the pin 212 according to said second orientations as the retainer 216 is able to toggle between multiple positions about the central annular axis 280.

Effectively, different and multiple positions of the retainer 216 against the section 176 or the axle 164 (and thus corresponding positions of the pin 212 to accommodate the manufacturing tolerances) may be perused both in the first state 332 and in the second state 336 of the body 264 of the retainer 216, thus aiding in the assembly process of the axle 164 to the chassis 128. A similar process may be contemplated when switching or reversing the body 264 from the second state 336 to the first state 332.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

It will be apparent to those skilled in the art that various modifications and variations can be made to the method and/or system of the present disclosure without departing from the scope of the disclosure. Other embodiments will be apparent to those skilled in the art from consideration of the specification and practice of the method and/or system disclosed herein. It is intended that the specification and examples be considered as exemplary only, with a true scope of the disclosure being indicated by the following claims and their equivalent.

What is claimed is:

1. A retainer for retaining a pin with a section of a work machine, the pin rotatably coupling a dog bone linkage to the section of the work machine, the retainer comprising:
    a body configured to be reversed between a first state and a second state to secure the pin with the section in each of the first state and the second state, the body defining:
        a retaining portion; and
        a securing portion fixedly coupled to the retaining portion and defining a plurality of through-holes, wherein the securing portion includes an annular structure defining an inner circumferential surface and the retaining portion includes an arm extending diametrically across the annular structure symmetrically dividing the inner circumferential surface into a first inner circumferential surface and a second inner circumferential surface;
    wherein:
    in the first state, the plurality of through-holes are correspondingly aligned with a plurality of apertures of the section to receive fasteners therethrough for coupling the body to the section such that the retaining portion acquires one or more first orientations relative to the section to engage the pin according to the one or more first orientations,
    in the second state, the plurality of through-holes are correspondingly aligned with the plurality of apertures of the section to receive the fasteners therethrough for coupling the body to the section such that the retaining portion acquires one or more second orientations relative to the section to engage the pin according to the one or more second orientations, and the one or more second orientations are different from the one or more first orientations.

2. The retainer of claim 1, wherein the arm defines a first side edge surface and a second side edge surface, and the body defines:
    corresponding first stress relieving regions at one or more interfaces defined between the first side edge surface and the first inner circumferential surface, and
    corresponding second stress relieving regions at one or more interfaces defined between the second side edge surface and the second inner circumferential surface.

3. The retainer of claim 1, wherein the arm and the annular structure are both defined along a common plane.

4. The retainer of claim 3, wherein the body is flipped 180 degrees about a flip axis from one of the first state and the second state to reverse to the other of the first state and the second state, wherein the flip axis extends in the common plane.

5. The retainer of claim 1, wherein the plurality of through-holes is rotationally and equidistantly arrayed on the annular structure along an annular path defined by the annular structure.

6. The retainer of claim 1, wherein each through-hole of the plurality of through-holes defines a hole axis and the annular structure defines a central annular axis, wherein the central annular axis is equidistant from each hole axis.

7. The retainer of claim 1, wherein the arm is configured to be received into a keyway defined by the pin to engage the pin.

8. The retainer of claim 1, wherein the pin includes:
    a first cylindrical lobe portion and a second cylindrical lobe portion co-axially arranged and oppositely disposed relative to each other, the first cylindrical lobe portion and the second cylindrical lobe portion being correspondingly received into a yoke portion of the section; and
    an intermediate cylindrical lobe portion arranged between the first cylindrical lobe portion and the second cylindrical lobe portion and to receive the dog bone linkage therearound, wherein the intermediate cylindrical lobe portion is disposed eccentrically relative to each of the first cylindrical lobe portion and the second cylindrical lobe portion.

9. The retainer of claim 1, wherein the section includes one of an axle or a chassis of the work machine.

10. A work machine, comprising:
    a dog bone linkage;
    a section defining a plurality of apertures;
    a pin rotatably coupling the dog bone linkage to the section;
    a retainer for retaining the pin with the section, the retainer including:
        a body configured to be reversed between a first state and a second state to secure the pin with the section in each of the first state and the second state, the body defining:
            a retaining portion, and
            a securing portion fixedly coupled to the retaining portion and defining a plurality of through-holes, wherein;
    the retaining portion and the securing portion are both defined along a common plane;
    the body is flipped 180 degrees about a flip axis from one of the first state and the second state to reverse to the other of the first state and the second state, wherein the flip axis extends in the common plane;

in the first state, the plurality of through-holes are correspondingly aligned with the plurality of apertures to receive fasteners therethrough for coupling the body to the section such that the retaining portion acquires one or more first orientations relative to the section to engage the pin according to the one or more first orientations, in the second state, the plurality of through-holes are correspondingly aligned with the plurality of apertures to receive the fasteners therethrough for coupling the body to the section such that the retaining portion acquires one or more second orientations relative to the section to engage the pin according to the one or more second orientations, and the one or more second orientations are different from the one or more first orientations.

11. The work machine of claim 10, wherein the securing portion includes an annular structure defining an inner circumferential surface and the retaining portion includes an arm extending diametrically across the annular structure symmetrically dividing the inner circumferential surface into a first inner circumferential surface and a second inner circumferential surface.

12. The work machine of claim 11, wherein the arm defines a first side edge surface and a second side edge surface, and the body defines:

corresponding first stress relieving regions at one or more interfaces defined between the first side edge surface and the first inner circumferential surface, and corresponding second stress relieving regions at one or more interfaces defined between the second side edge surface and the second inner circumferential surface.

13. The work machine of claim 11, wherein the plurality of through-holes is rotationally and equidistantly arrayed on the annular structure along an annular path defined by the annular structure.

14. The work machine of claim 11, wherein each through-hole of the plurality of through-holes defines a hole axis and the annular structure defines a central annular axis, wherein the central annular axis is equidistant from each hole axis.

15. The work machine of claim 11, wherein the pin defines a keyway and the arm is configured to be received into the keyway to engage the pin.

16. The work machine of claim 10, wherein the pin includes:

a first cylindrical lobe portion and a second cylindrical lobe portion co-axially arranged and oppositely disposed relative to each other, the first cylindrical lobe portion and the second cylindrical lobe portion being correspondingly received into a yoke portion of the section; and an intermediate cylindrical lobe portion arranged between the first cylindrical lobe portion and the second cylindrical lobe portion and to receive the dog bone linkage therearound, wherein the intermediate cylindrical lobe portion is disposed eccentrically relative to each of the first cylindrical lobe portion and the second cylindrical lobe portion.

17. The work machine of claim 10, wherein the section includes one of an axle or a chassis of the work machine.

18. A work machine, comprising:

a dog bone linkage;

a section defining a pin aperture and a plurality of apertures disposed about the pin aperture;

a pin rotatably coupling the dog bone linkage to the section along a fixed central axis of the pin aperture;

a retainer for retaining the pin with the section, the retainer configured to be reversed between a first state and a second state to secure the pin with the section in each of the first state and the second state, the retainer comprising:

a retaining portion configured to obstruct displacement of the pin along the fixed central axis in the first state and the second state; and a securing portion fixedly coupled to the retaining portion and defining a plurality of through-holes configured to align with some or all of the plurality of apertures in the first state and the second state, wherein:

in the first state, the plurality of through-holes are correspondingly aligned with the plurality of apertures to receive fasteners therethrough for coupling the retainer to the section such that the retaining portion acquires one or more first orientations relative to the section to engage the pin according to the one or more first orientations, in the second state, the plurality of through-holes are correspondingly aligned with the plurality of apertures to receive the fasteners therethrough for coupling the retainer to the section such that the retaining portion acquires one or more second orientations relative to the section to engage the pin according to the one or more second orientations, and the one or more second orientations are different from the one or more first orientations;

wherein the pin remains disposed along the fixed central axis for both the first state and the second state.

19. The work machine of claim 18, wherein a location of the pin relative to the section is identical for the first state and the second state.

\* \* \* \* \*